US005627504A

United States Patent [19]

Kleinhappl

[11] Patent Number: 5,627,504

[45] Date of Patent: May 6, 1997

[54] ELECTROMAGNETIC ACTUATING DEVICE, IN PARTICULAR FOR A VALVE

[75] Inventor: Erich Kleinhappl, Weinitzen, Austria

[73] Assignee: AVL Medical Instruments AG, Schaffhausen, Switzerland

[21] Appl. No.: 400,528

[22] Filed: Mar. 7, 1995

Related U.S. Application Data

[63] Continuation of Ser. No. 84,230, filed as PCT/AT93/00058, Mar. 30, 1993 published as WO93/20568, Oct. 14, 1993, abandoned.

[30] Foreign Application Priority Data

Apr. 7, 1992 [AT] Austria ........................................ 729/92

[51] Int. Cl.$^6$ ................................ H01F 7/00; H01F 7/10; F16K 31/02

[52] U.S. Cl. ........................ 335/230; 335/251; 251/129.15

[58] Field of Search .................................... 335/230, 231, 335/229, 234, 251, 265; 251/129.15

[56] References Cited

U.S. PATENT DOCUMENTS

| | | | |
|---|---|---|---|
| 4,056,255 | 11/1977 | Lace | 251/129.15 |
| 5,109,171 | 4/1992 | Schmider | 310/51 |
| 5,115,664 | 5/1992 | Hegde | 73/9 |
| 5,174,025 | 12/1992 | Tasaki . | |
| 5,268,662 | 12/1993 | Uetsuhara | 335/230 |

FOREIGN PATENT DOCUMENTS

| | | | |
|---|---|---|---|
| 0226106 | 8/1985 | Germany | 335/230 |
| 57-76805 | 5/1982 | Japan . | |
| 2099223 | 12/1982 | United Kingdom . | |

*Primary Examiner*—Leo P. Picard
*Assistant Examiner*—Stephen T. Ryan
*Attorney, Agent, or Firm*—Watson Cole Stevens Davis, P.L.L.C.

[57] ABSTRACT

Electromagnetic actuating device, in particular for a valve, includes a plunger which is axially movable between two extreme positions, an electromagnetic coil surrounding the plunger actuating it, and a permanent magnet holding the plunger in one of its extreme positions, and at least one pole plate located between plunger and permanent magnet. The holding force of the permanent magnet is considerably increased by providing that the permanent magnet, which is configured as a flat disk, be completely covered by the pole plate on the side facing the plunger.

7 Claims, 1 Drawing Sheet

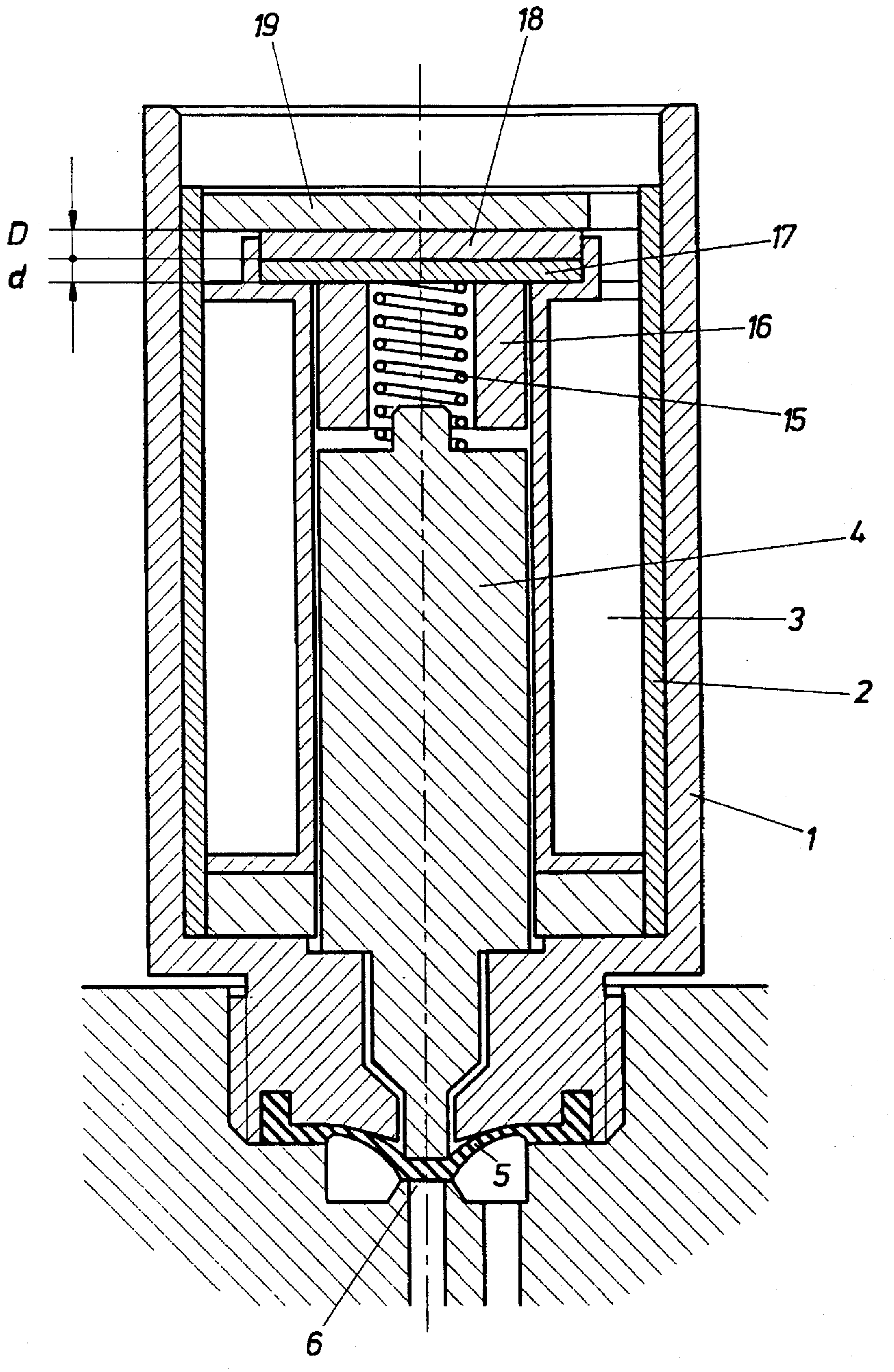
19
18
D
d
17
16
15
4
3
2
1
5
6

ELECTROMAGNETIC ACTUATING DEVICE, IN PARTICULAR FOR A VALVE

CROSS-REFERENCE TO RELATED APPLICATION

This application is a continuation of application Ser. No. 08/084,230, filed as PCT/AT93/00058, Mar. 30, 1993 published as WO93/20568, Oct. 14, 1993, now abandoned.

BACKGROUND OF THE INVENTION

1. Field of the Invention

The invention relates to an electromagnetic actuating device, in particular for a valve, includes a plunger which is axially movable between two extreme positions, and an electromagnetic coil for actuation of the plunger, the coil surrounding the plunger, and a permanent magnet to hold the plunger in one of its extreme positions, and at least one pole plate located between the plunger and the permanent magnet.

2. The Prior Art

In EP-A 373 142 a bistable magnet is described which is provided with a permanent magnet holding the actuating plunger in one of its extreme positions. On the permanent magnet a guide plate is placed whose diameter is smaller than that of the magnet. The plunger may be brought into contact with this guide plate by means of a magnetic short-circuit plate.

In this known arrangement a comparatively large permanent magnet of a conventional alloy, such as AlNiCo, is provided.

The demand for miniaturization of all components and the progress made in developing magnetic alloys have led to an increasing use of permanent magnets based on rare earths. The energy density of both the magnets based on samarium-cobalt and those of the neodymium-iron-boron group is considerably higher than that of conventional magnets. The magnetic properties of these materials are utilized best if the magnets are given a flat, disk-like shape.

It has been found that in known actuating devices of the above kind the magnetic holding forces obtained with the use of high-grade permanent magnets have proved unsatisfactory.

SUMMARY OF THE INVENTION

It is an object of the invention to avoid the above disadvantage and to provide an actuating device in which the magnetic forces of high-grade permanent magnets may be fully utilized.

For this purpose the invention provides that the permanent magnet configured as a flat disk be completely covered by the pole plate on the side facing the plunger.

Due to the configuration proposed by the invention, it seems that even the rim of an extremely flat permanent magnet may be utilized for attracting the plunger. The pole plate acts as a means of focusing the magnetic lines of force.

In a preferred variant of the invention two pole plates are provided between plunger and permanent magnet, the first having essentially the same diameter as the permanent magnet and the second essentially the diameter of the plunger. As a consequence, the magnetic force lines are focused even more efficiently. It would also be possible to provide the two pole plates in one piece.

A particularly simple and compact actuating device is obtained by configuring the second pole plate as a tube inside which a spring is provided which holds the plunger in its other extreme position.

The forces which are transmitted from the electromagnetic coil onto the plunger may be considerably increased by providing that the pole plate cover the top face of the electromagnetic coil at least partially. In this way the coil may be kept much smaller and lighter, while its switching power is maintained.

An especially favorable combination of efficient operation and economical use of material is obtained by using a pole plate whose thickness is smaller than that of the permanent magnet. In this context it is recommended that the thickness of the pole plate amount to 30–80% of the thickness of the permanent magnet.

BRIEF DESCRIPTION OF THE FIGURE

Following is a detailed description of an embodiment of the invention as illustrated by the accompanying FIGURE in which a longitudinal section of an actuating device is shown.

DETAILED DESCRIPTION OF THE PREFERRED EMBODIMENT

The actuating device comprises a shell 1 in which is located a magnetically permeable sleeve 2. An electromagnetic coil 3 is arranged concentrically around a plunger 4 which is movable in axial direction. The plunger 4 is used for switching a valve (shown schematically) by pressing a diaphragm 5 against an opening 6.

On the side of the plunger 4 facing away from the valve a permanent magnet 18 is provided which is configured as a flat disk of the thickness D. On the side facing the plunger 4, directly adjacent to the permanent magnet 18, a pole plate 17 is provided, which is made of magnetically permeable material and has the same diameter as the permanent magnet 18. The pole plate 17 has the thickness d. Another pole plate 16, whose exterior dimension essentially corresponds to that of the plunger 4, is adjacent to the pole plate 17. Inside this tubular pole plate 16 a spring 15 is provided, which will press the plunger 4 into its extreme lower position, as is shown in the drawing.

The actuating device of the invention is bistable, i.e., the two extreme positions of the plunger 4 are maintained in the absence of exterior forces. The electromagnetic coil 3 is only used for switching from one extreme position to the other. In the lower position shown in the drawing the plunger 4 is held by the spring 15. In its upper position the plunger 4 is held by the permanent magnet 18. Towards the top the actuating device is closed off by a magnetically permeable plate 19.

The effect of the pole plate 17 was examined in a comparative test. First of all, the magnet of the invention (as shown in the drawing) was tested by determining the holding force of the plunger 4 in its extreme upper position, i.e., the force required for taking the plunger 4 from its upper to its lower position. For the measuring process the spring 15 was removed to prevent it from exerting any force.

For the purpose of comparison the same device was tested after removal of the pole plate 17. For the device of the invention a holding force of 16N was obtained, whereas the holding force in the comparative test was 7N.

This test shows that the holding force of the permanent magnet 18 may be approximately doubled with the use of the pole plate 17, all other parameters remaining the same.

I claim:

1. Electromagnetic actuating device, comprising:

a plunger which is axially movable between a first and a second extreme position, said plunger defining a first diameter, an electromagnetic coil surrounding said plunger for actuation of said plunger, a permanent magnet configured as a non-perforated flat disk and located outside said electromagnetic coil for holding said plunger in said first extreme position, said non-perforated flat disk defining a second diameter which is greater than said first diameter, and a non-perforated first pole plate located between said plunger and said permanent magnet, said first pole plate being dimensioned to completely cover said permanent magnet on a side thereof facing said plunger.

2. Actuating device according to claim 1, including a second pole plate located between said plunger and said permanent magnet, said first pole plate having a diameter essentially equal to said second diameter of said permanent magnet and said second pole plate having a diameter essentially equal to said first diameter of said plunger.

3. Actuating device according to claim 2, wherein said second pole plate is configured as a tube, and including a spring positioned inside said second pole plate for holding said plunger in said second extreme position.

4. Actuating device according to claim 1, wherein said first pole plate at least partially covers a top face of said electromagnetic coil.

5. Actuating device according to claim 1, wherein a thickness of said first pole plate is smaller than a thickness of said permanent magnet.

6. Actuating device according to claim 5, wherein the thickness of said first pole plate is about 30–80% of the thickness of said permanent magnet.

7. Actuating device according to claim 1, comprising a valve chamber with an opening for a medium passing therethrough, said opening being closable by means of said plunger.

* * * * *